United States Patent
Kazama et al.

(10) Patent No.: US 10,294,977 B2
(45) Date of Patent: May 21, 2019

(54) FASTENING MEMBER AND ROD-LIKE MEMBER FOR FASTENING MEMBER

(71) Applicants: NHK Spring Co., Ltd., Yokohama-shi (JP); TOPURA CO., LTD., Hadano-shi (JP)

(72) Inventors: Toshio Kazama, Kanagawa (JP); Takeshi Suzuki, Kanagawa (JP); Shigeto Mori, Kanagawa (JP)

(73) Assignees: NHK Spring Co., Ltd., Yokohama-shi (JP); TOPURA CO., LTD., Hadano-shi (JP)

( * ) Notice: Subject to any disclaimer, the term of this patent is extended or adjusted under 35 U.S.C. 154(b) by 350 days.

(21) Appl. No.: 15/126,698

(22) PCT Filed: Mar. 20, 2015

(86) PCT No.: PCT/JP2015/058620
§ 371 (c)(1),
(2) Date: Sep. 16, 2016

(87) PCT Pub. No.: WO2015/141857
PCT Pub. Date: Sep. 24, 2015

(65) Prior Publication Data
US 2017/0089384 A1    Mar. 30, 2017

(30) Foreign Application Priority Data

Mar. 20, 2014 (JP) ................. 2014-059148

(51) Int. Cl.
*F16B 35/04* (2006.01)
*F16B 33/00* (2006.01)
(Continued)

(52) U.S. Cl.
CPC ............ *F16B 33/00* (2013.01); *B32B 15/016* (2013.01); *C22C 21/06* (2013.01); *C22C 21/10* (2013.01); *F16B 33/06* (2013.01)

(58) Field of Classification Search
CPC ........ F16B 33/00; B32B 15/016; C22C 21/06
(Continued)

(56) References Cited

U.S. PATENT DOCUMENTS 3,803,972 A * 4/1974 Deutsher ............... F16B 33/004
                                                              411/337
4,035,201 A * 7/1977 Anderson ............ B21D 51/383
                                                              148/535

(Continued)

FOREIGN PATENT DOCUMENTS

GB           272706 A       6/1927
JP        06-257609 A       9/1994
(Continued)

OTHER PUBLICATIONS

International Search Report dated Jun. 23, 2015, issued for PCT/JP2015/058620.
(Continued)

*Primary Examiner* — Gary W Estremsky
(74) *Attorney, Agent, or Firm* — Locke Lord LLP (57) ABSTRACT

A fastening member includes a first alloy portion and a second alloy portion. The first alloy portion is made of an aluminum alloy including 0.005 wt % to 5.0 wt % zinc and 0.6 wt % to 2.0 wt % magnesium and is provided to a part that comes into contact with at least one of a plurality of members serving as a fastening target. The second alloy portion is made of an aluminum alloy including more than 2.0 wt % and 5.0 wt % or less magnesium and more than 5.0 wt % and 10 wt % or less zinc and is joined to the first alloy portion.

10 Claims, 5 Drawing Sheets

(51) Int. Cl.
*F16B 33/06* (2006.01)
*C22C 21/06* (2006.01)
*C22C 21/10* (2006.01)
*B32B 15/01* (2006.01)

(58) Field of Classification Search
USPC .......................................................... 411/424
See application file for complete search history.

(56) References Cited

U.S. PATENT DOCUMENTS

| | | | | |
|---|---|---|---|---|
| 6,048,415 | A * | 4/2000 | Nakai | C22F 1/053 |
| | | | | 148/417 |
| 6,673,469 | B2 * | 1/2004 | Isacesson | C23F 15/00 |
| | | | | 411/902 |
| 8,740,532 | B2 * | 6/2014 | Wiebe | F02F 1/24 |
| | | | | 411/389 |
| 8,944,735 | B2 * | 2/2015 | Sugimoto | F16B 33/004 |
| | | | | 411/368 |
| 2007/0110544 | A1 * | 5/2007 | Friederich | C22C 21/06 |
| | | | | 411/387.4 |
| 2010/0159275 | A1 * | 6/2010 | Geho | B21D 51/26 |
| | | | | 428/654 |
| 2011/0194974 | A1 * | 8/2011 | Wakaguri | C22C 21/10 |
| | | | | 420/541 |

FOREIGN PATENT DOCUMENTS

| | | |
|---|---|---|
| JP | 2003-094164 A | 4/2003 |
| JP | 3705320 B2 | 10/2005 |
| JP | 2008-106848 A | 5/2008 |
| JP | 2012-112476 A | 6/2012 |
| JP | 5335056 B2 | 11/2013 |
| WO | 2013/073575 A1 | 5/2013 |

OTHER PUBLICATIONS

"International Alloy Designations and Chemical Composition Limits for Wrought Aluminum and Wrought Aluminum Alloys," 2015, The Aluminum Association, Inc., XP055494916. (cited in the Jul. 30, 2018 Office Action issued for EP15764209.1).

Office Action dated Jul. 30, 2018, issued for the European patent application No. 15764209.1.

Decision of a Patent Grant dated Jul. 10, 2018, issued for the corresponding Japanese patent application No. 2016-508845 and English translation thereof.

Isao Iwayama et al., "6056 Aluminum Alloy Wire for Automotive Fasteners", SEI Technical Review, No. 77, Oct. 2013, pp. 74-78. (cited in the Sep. 26, 2017 EP Search Report).

Dmitriy Petrov et al., "Aluminium-Magnesium-Zinc", Landolt-Bornstein New Series IV/11A3, Jan. 2005, pp. 191-209. (cited in the Sep. 26, 2017 EP Search Report).

Supplementary Search Report dated Sep. 26, 2017, issued for European patent application No. 15764209.1.

* cited by examiner

FASTENING MEMBER AND ROD-LIKE MEMBER FOR FASTENING MEMBER

FIELD

The present invention relates to a fastening member that fastens a plurality of members and a rod-like member for a fastening member used to manufacture the fastening member.

BACKGROUND

To improve fuel efficiency of cars, various parts have been conventionally expected to reduce the weight. An aluminum alloy is used instead of cast iron as a material for an engine block, and a magnesium alloy is used instead of steel as a material for an engine cover and an oil pan, for example.

When the parts made of the aluminum alloy or the magnesium alloy described above are fastened with a conventional steel bolt, the steel bolt is likely to loosen because of large difference between the coefficient of linear expansion of the aluminum alloy and the magnesium alloy and that of the steel. Furthermore, the steel bolt is likely to be corroded by contact with different types of metals. To sufficiently secure the reliability of fastening, it is necessary to make a tapped hole in the parts deeper and make the length of the shaft of the steel bolt longer. Furthermore, it is necessary to make the diameter of the steel bolt larger. The length of the shaft of the steel bolt, however, affects the thickness of the parts, and the diameter of the steel bolt affects the width of a flange in which the tapped hole is formed. As a result, the use of the steel bolt to fasten the parts made of the aluminum alloy and the magnesium alloy is an obstacle to weight reduction.

To solve such a problem of the steel bolt, there have been developed techniques for employing an aluminum alloy bolt as a fastening member that fastens parts made of an aluminum alloy and a magnesium alloy (refer to Patent Literature 1, for example). Patent Literature 1 discloses a 6000 series aluminum alloy as a material for a bolt having excellent workability when being processed into a bolt and sufficient strength. The aluminum alloy bolt has small difference in the coefficient of liner expansion with that of the aluminum alloy and the magnesium alloy constituting various parts. Furthermore, the aluminum alloy bolt is less likely to be corroded by contact with different types of metals. With these properties, the aluminum alloy bolt can secure the reliability of fastening even if the tapped hole in the parts is made shallower or the diameter of the bolt is made smaller. The aluminum alloy bolt is thus suitably used to reduce the weight.

There have also been developed a 7000 series aluminum alloy as an aluminum alloy having higher strength than that of the 6000 series aluminum alloy (refer to Patent Literature 2, for example). The use of the 7000 series aluminum alloy enables production of a bolt having higher strength than that of the 6000 series aluminum alloy bolt.

CITATION LIST

Patent Literature

Patent Literature 1: Japanese Patent No. 5335056
Patent Literature 2: Japanese Patent No. 3705320

SUMMARY

Technical Problem

The 7000 series aluminum alloy, however, typically has poorer stress corrosion cracking resistance than that of the 6000 series aluminum alloy. To use the 7000 series aluminum alloy for a bolt, it is necessary to improve the stress corrosion cracking resistance. Under such circumstances, there has been an increasing demand for a fastening member made of a material having high strength and excellent stress corrosion cracking resistance.

In view of the circumstances described above, it is an object of the present invention to provide a fastening member having high strength and excellent stress corrosion cracking resistance and a rod-like member for a fastening member used to manufacture the fastening member.

Solution to Problem

To solve the problem and achieve the object, a fastening member according to the present invention fastens a plurality of members, and includes: a first alloy portion made of an aluminum alloy including 0.005 wt % to 5.0 wt % zinc and 0.6 wt % to 2.0 wt % magnesium and provided to a part that comes into contact with at least one of the members; and a second alloy portion made of an aluminum alloy including more than 2.0 wt % and 5.0 wt % or less magnesium and more than 5.0 wt % and 10 wt % or less zinc and joined to the first alloy portion.

In the fastening member according to the above-described invention, Vickers hardness of the second alloy portion is 170 or higher.

In the fastening member according to the above-described invention, a screw thread is formed on part of a surface of the first alloy portion.

In the fastening member according to the above-described invention, the fastening member is a male screw including a cylindrical shaft with the screw thread formed on at least part of an outer periphery, a head provided to an end in an axial direction of the shaft, and a neck corresponding to a boundary between the shaft and the head, the first alloy portion serves as at least a surface layer of the screw thread, a surface of the neck, and a surface layer of a bearing surface of the head, and the thickness in a radial direction of the surface layer of the screw thread in the first alloy portion is $1/2000$ or larger and $1/10$ or smaller of a major diameter of the shaft.

In the fastening member according to the above-described invention, the fastening member is a female screw with the screw thread formed on an inner surface of a hole formed at a center, the second alloy portion is positioned on an outer periphery of the first alloy portion, and the thickness in a radial direction of the first alloy portion is $1/2000$ or larger and $1/10$ or smaller of a major diameter of the female screw.

In the fastening member according to the above-described invention, the fastening member is a rivet including a cylindrical shaft, a head provided to an end in an axial direction of the shaft, and a neck corresponding to a boundary between the shaft and the head, the first alloy portion serves as at least a surface layer of the shaft, a surface of the neck, and a surface layer of a bearing surface of the head, and the thickness in a radial direction of the first alloy portion in the shaft is $1/2000$ or larger and $1/10$ or smaller of an outer diameter of the shaft.

A rod-like member for a fastening member according to the present invention includes: a core made of an aluminum alloy having a cylindrical shape and including more than 2.0 wt % and 5.0 wt % or less magnesium and more than 5.0 wt % and 10 wt % or less zinc; and an outer peripheral portion made of an aluminum alloy having a hollow cylindrical shape completely covering a side surface of the core and including 0.005 wt % to 5.0 wt % zinc and 0.6 wt % to 2.0 wt % magnesium.

In the rod-like member for a fastening member according to the above-described invention, the thickness in a radial direction of the outer peripheral portion is 1/2000 or larger and 1/10 or smaller of a major diameter of the outer peripheral portion.

A rod-like member for a fastening member according to the present invention includes: a core made of an aluminum alloy having a hollow cylindrical shape and including 0.005 wt % to 5.0 wt % zinc and 0.6 wt % to 2.0 wt % magnesium; and an outer peripheral portion made of an aluminum alloy having a hollow cylindrical shape completely covering a side surface of the core and including more than 2.0 wt % and 5.0 wt % or less magnesium and more than 5.0 wt % and 10 wt % or less zinc.

In the rod-like member for a fastening member according to the above-described invention, the thickness in a radial direction of the core is 1/2000 or larger and 1/10 or smaller of a major diameter of the outer peripheral portion.

Advantageous Effects of Invention

According to the present invention, by using a cladding material including an aluminum alloy with high strength and an aluminum alloy with excellent stress corrosion cracking resistance, it is possible to provide a fastening member having high strength and excellent stress corrosion cracking resistance.

DESCRIPTION OF EMBODIMENTS

Aspects (hereinafter, referred to as "embodiments") to embody the present invention are described below with reference to the accompanying drawings. The drawings schematically illustrate the embodiments, and the relation between the thickness and the width in each portion and the ratio of the thickness between portions may possibly be different from those of the actual structure. The relation and the ratio of the size may possibly be different between the drawings.

First Embodiment

Figure 1:
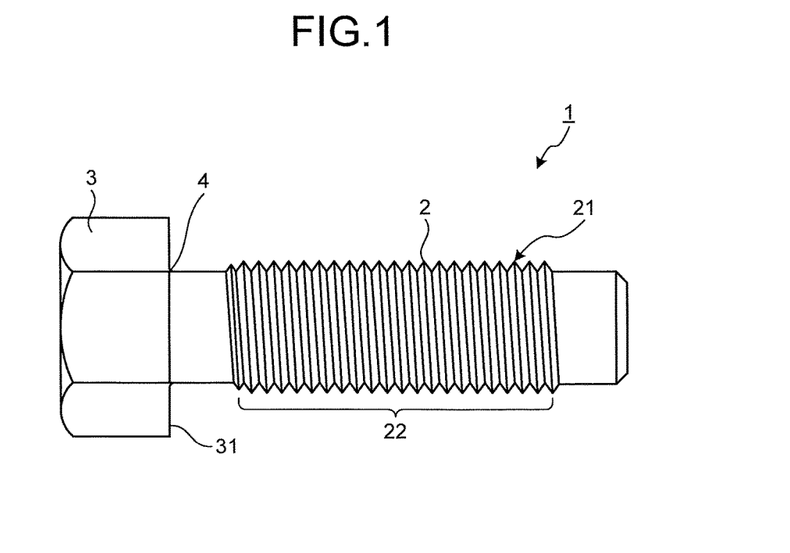
FIG. 1 is a side view of a structure of a fastening member according to a first embodiment of the present invention.
Figure 2:
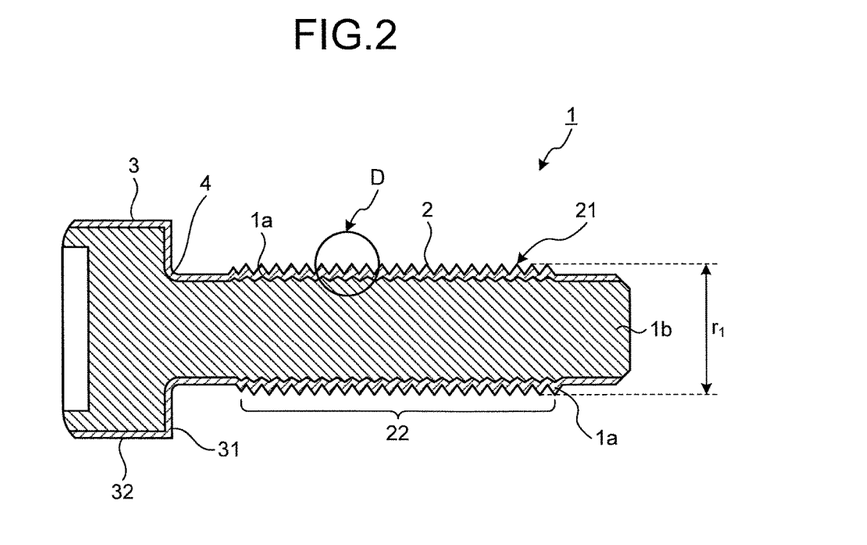
FIG. 2 is a sectional view along a center axis of the fastening member illustrated in FIG. 1.

FIG. 1 is a side view of a structure of a fastening member according to a first embodiment of the present invention. FIG. 2 is a sectional view along a center axis in the longitudinal direction (horizontal direction in FIG. 1) of the fastening member illustrated in FIG. 1. A fastening member 1 illustrated in these figures is a bolt (a kind of male screw) made of a cladding material obtained by joining two different types of aluminum (Al) alloys. The fastening member 1 includes a shaft 2, a head 3, and a neck 4. The shaft 2 has a cylindrical shape. The head 3 is provided to an end in the axial direction (horizontal direction in FIG. 1) of the shaft 2. The neck 4 corresponds to a boundary between the shaft 2 and the head 3. The shaft 2 has a screw portion 22 with screw threads 21 formed on its surface. The shape (hexagon trimmed head) of the head 3 illustrated in FIG. 1 is given by way of example only, and the head 3 may have another shape (e.g., a hexagon flanged head, a pan head, a countersunk head, a truss head, or a flat head).

The fastening member 1 has a first alloy portion 1a and a second alloy portion 1b made of two different types of aluminum alloys. The first alloy portion 1a is provided to a part that comes into contact with a fastening target member. In other words, the first alloy portion 1a serves as the surface layer of the shaft 2, the surface of the neck 4, and the surface layer of a bearing surface 31 and a side surface 32 of the head 3. The second alloy portion 1b serves as an inner part in the radial direction of the shaft 2 and the head 3. The second alloy portion 1b may be exposed at a part that comes into contact with none of a plurality of fastening target members when the fastening target members are fastened with the fastening member 1.

The first alloy portion 1a is made of an aluminum alloy including 0.005 wt % or more and 5.0 wt % or less zinc (Zn) and 0.6 wt % or more and 2.0 wt % or less magnesium (Mg). The aluminum alloy preferably includes at least one type of element out of a group of copper (Cu), chromium (Cr), zirconium (Zr), iron (Fe), silicon (Si), manganese (Mn), titanium (Ti), vanadium (V), and scandium (Sc). Examples of the aluminum alloy having such a composition include, but are not limited to, A6056. A6056 is an alloy having Al—Mg—Si as a main element and is known as an aluminum alloy having relatively high strength and excellent stress corrosion cracking resistance. The thickness of the first alloy portion 1a is 10 μm or larger and 1.5 mm or smaller. The thickness in the radial direction of the first alloy portion 1a in the shaft 2 is 1/2000 or larger and 1/10 or smaller of a major diameter $r_1$ (refer to FIG. 2) of the shaft 2.

The second alloy portion 1b is made of an aluminum alloy including more than 2.0 wt % wt % or less magnesium (Mg) and more than 5.0 wt % and 10 wt % or less zinc (Zn). The aluminum alloy preferably includes at least one type of element out of a group of copper (Cu), chromium (Cr), zirconium (Zr), iron (Fe), silicon (Si), manganese (Mn), titanium (Ti), vanadium (V), and scandium (Sc) and more preferably includes copper (Cu) and zirconium (Zr). Examples of the aluminum alloy having such a composition include, but are not limited to, A7050. A7050 is known as an aluminum alloy having high strength. Specifically, the second alloy portion 1b preferably has Vickers hardness of 170 or higher.

Figure 3:
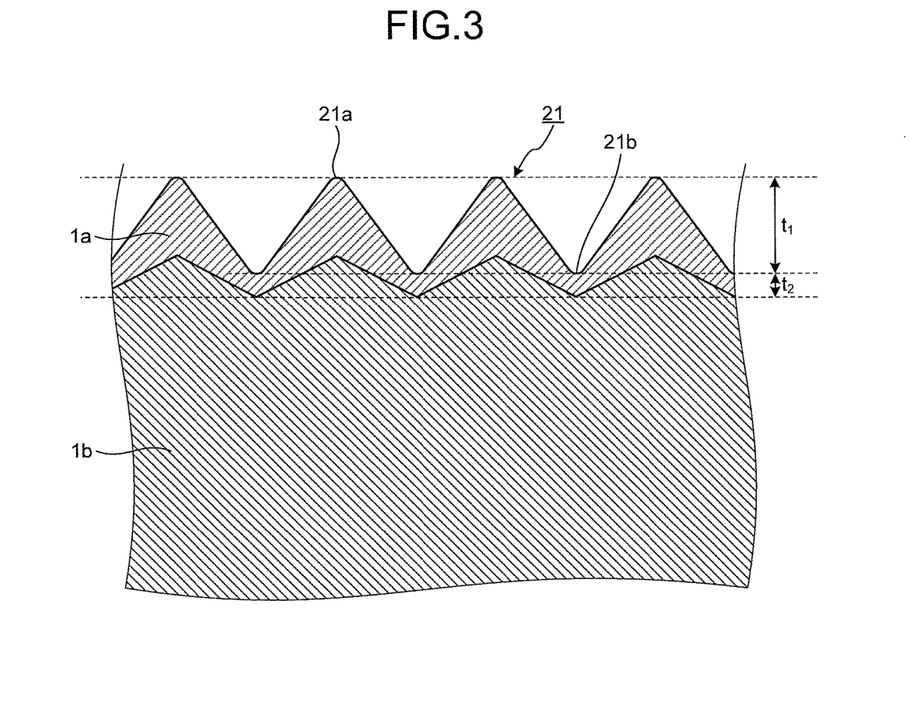
FIG. 3 is an enlarged view of an area D in FIG. 2.

FIG. 3 is an enlarged view of an area D in FIG. 2. As illustrated in FIG. 3, the thickness in the radial direction of the surface layer of the screw threads 21 in the screw portion 22 of the first alloy portion 1a is not necessarily uniform. A thickness $t_1$ of a crest 21a is larger than a thickness $t_2$ of a root 21b ($t_1 > t_2$). The thickness in the radial direction of the surface layer of the screw threads 21 falls within a range of 1/2000 or larger and 1/10 or smaller of the major diameter $r_1$ of the shaft 2. With this structure, all the parts that come into contact with at least the fastening target member in the screw portion 22 are an aluminum alloy having excellent stress corrosion cracking resistance.

Figure 4:
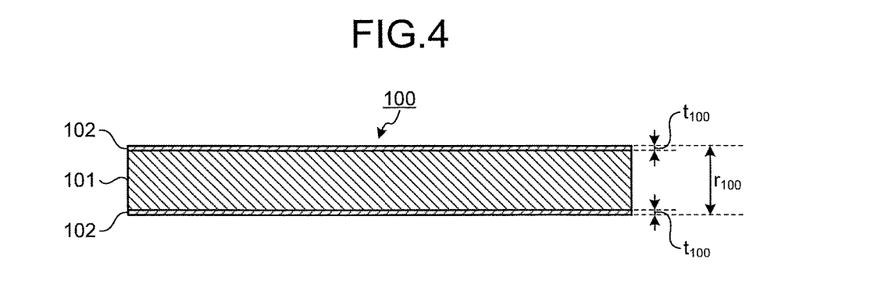
FIG. 4 is a sectional view of a structure of a rod-like member for a fastening member according to the first embodiment of the present invention.

FIG. 4 is a sectional view of a structure of a rod-like member for a fastening member serving as a raw material for the fastening member 1. A rod-like member 100 for a fastening member illustrated in this figure (hereinafter, simply referred to as a "rod-like member 100") has a two-layered cylindrical shape including a core 101 and an outer peripheral portion 102. The core 101 has a cylindrical shape and is made of the same aluminum alloy as that of the second alloy portion 1b. The outer peripheral portion 102 covers the outer periphery of the core 101 and is made of the same aluminum alloy as that of the first alloy portion 1a. A thickness $t_{100}$ of the outer peripheral portion 102 is 1/2000 or larger and 1/10 or smaller of a diameter $r_{100}$ of the rod-like member 100 ($r_{100}/2000_{100} \leq t_{100} \leq r_{100}/10$). The fastening member 1 is produced by performing a wiredrawing process, a header process, and other processes on the rod-like member 100. To enable such production, the aluminum alloy constituting the core 101 serving as the second alloy portion 1b after the production preferably has breaking elongation of 8% or larger at room temperature (substantially 1 to 35° C.).

The fastening member 1 is produced by performing a wiredrawing process and a header process on the rod-like member 100. After the production, the screw portion 22 has a fiber flow in which metallic crystals are fibrously elongated along the shape of the screw surface. If a crack is caused in the screw portion 22, the crack runs across the fiber flow. The fiber flow thus can suppress stress corrosion cracking.

As described above, the first embodiment according to the present invention has a two-layered structure including the first alloy portion and the second alloy portion. The first alloy portion is provided to a part that comes into contact with a fastening target member and is made of an aluminum alloy having excellent stress corrosion cracking resistance. The second alloy portion is provided to the other part and is made of an aluminum alloy having high strength. The first embodiment thus can provide a fastening member having high strength and excellent stress corrosion cracking resistance.

The screw threads are formed on part of the surface of the first alloy portion according to the first embodiment. The first embodiment thus can improve the stress corrosion cracking resistance at a part that comes into contact with the fastening target member.

The male screw according to the first embodiment has the first alloy portion on the outer periphery including the screw threads. The thickness in the radial direction of the surface layer of the screw threads in the male screw is 1/2000 or larger and 1/10 or smaller of the outer diameter of the screw portion. The first embodiment thus can provide both the strength and the stress corrosion cracking resistance in an appropriate balance.

The first embodiment employs a rod-like member for a fastening member made of a cladding material including the outer peripheral portion and the core. The outer peripheral portion has a hollow cylindrical shape, is provided to a part that comes into contact with a fastening target member, and is made of an aluminum alloy having excellent stress corrosion cracking resistance. The core has a cylindrical shape completely covered with the outer peripheral portion and is made of an aluminum alloy having high strength. The first embodiment thus enables production of a fastening member (male screw) having high strength and excellent stress corrosion cracking resistance by the same manufacturing method as that of the conventional technology.

The thickness in the radial direction of the outer peripheral portion of the rod-like member for a fastening member according to the first embodiment is 1/2000 or larger and 1/10 or smaller of the diameter of the rod-like member for a fastening member. The first embodiment thus can provide both the strength and the stress corrosion cracking resistance in an appropriate balance in the produced fastening member (male screw).

Second Embodiment

Figure 5:
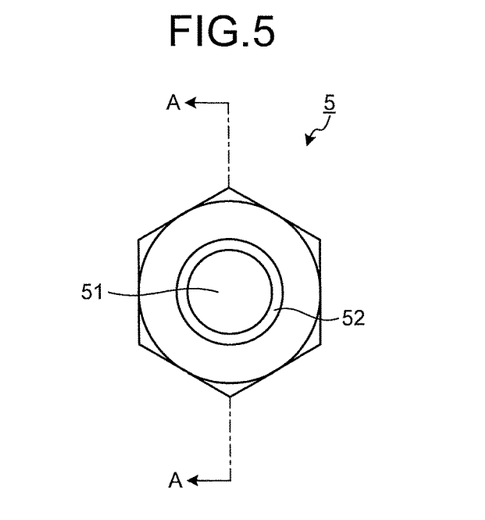
FIG. 5 is a plan view of a structure of a fastening member according to a second embodiment of the present invention.
Figure 6:
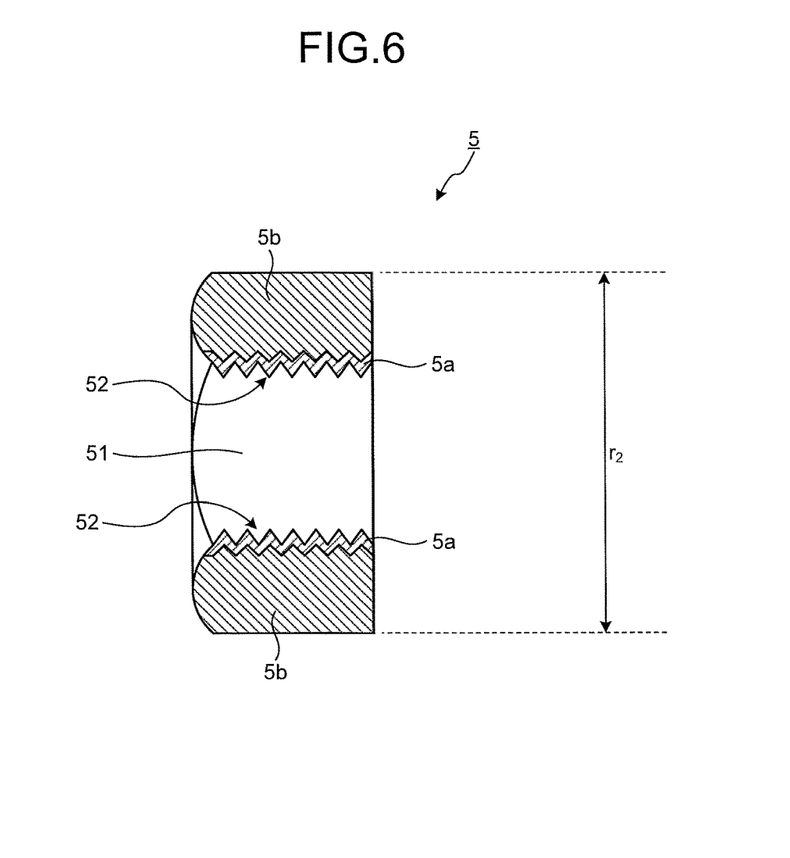
FIG. 6 is a sectional view along line A-A in FIG. 5.

FIG. 5 is a plan view of a structure of a fastening member according to a second embodiment of the present invention. FIG. 6 is a sectional view along line A-A in FIG. 5. A fastening member 5 illustrated in these figures is a nut (a kind of female screw) made of a cladding material obtained by joining two different types of aluminum alloys. The fastening member 5 has a hollow cylindrical shape. The fastening member 5 has a hole 51 at the center thereof, and screw threads 52 are formed on the inner surface of the hole 51. The shape (hexagon nut) of the fastening member 5 illustrated in FIG. 5 is given by way of example only, and the fastening member 5 may be a nut having another shape (e.g., a flange nut, a cap nut, or a high nut).

The fastening member 5 has a first alloy portion 5a and a second alloy portion 5b made of two different types of aluminum alloys. The first alloy portion 5a has a ring shape serving as the surface layer of the screw threads 52 corresponding to a part that comes into contact with a fastening target member. The second alloy portion 5b has a ring shape covering the outer peripheral surface of the first alloy portion 5a.

The first alloy portion 5a is made of the same aluminum alloy as that of the first alloy portion 1a according to the first embodiment. The second alloy portion 5b is made of the same aluminum alloy as that of the second alloy portion 1b according to the first embodiment. Similarly to the first alloy portion 1a, the thickness of the first alloy portion 5a is 10 µm or larger and 1.5 mm or smaller. The thickness in the radial direction of the first alloy portion 5a is 1/2000 or larger and 1/10 or smaller of a major diameter (circle equivalent diameter) $r_2$ (refer to FIG. 6) of the fastening member 5. Similarly to the second alloy portion 1b, the second alloy portion 5b has Vickers hardness of 170 or higher and breaking elongation of 8% or larger at room temperature.

The thickness in the radial direction of the surface layer of the screw threads 52 in the first alloy portion 5a is not necessarily uniform. The thickness falls within a range of 1/2000 or larger and 1/10 or smaller of the major diameter (circle equivalent diameter) $r_2$ of the fastening member 5. With this structure, all the screw threads 52 serving as the part that comes into contact with at least the fastening target member are an aluminum alloy having excellent stress corrosion cracking resistance.

Figure 7:
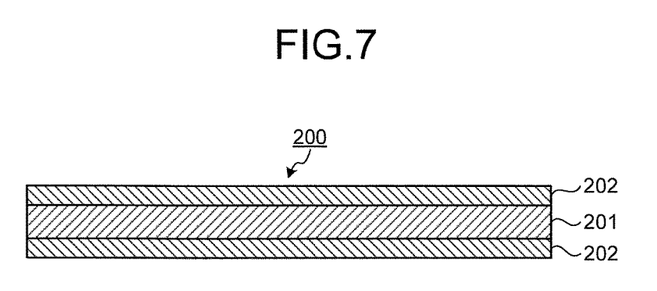
FIG. 7 is a sectional view of a structure of a rod-like member for a fastening member according to the second embodiment of the present invention.

FIG. 7 is a sectional view of a structure of a rod-like member for a fastening member serving as a raw material for the fastening member 5. A rod-like member 200 for a fastening member illustrated in this figure (hereinafter, simply referred to as a "rod-like member 200") is a two-layered cylindrical cladding material including a core 201 and an outer peripheral portion 202. The core 201 has a cylindrical shape and is made of the same aluminum alloy as that of the first alloy portion 5a. The outer peripheral portion 202 covers the outer periphery of the core 201 and is made of the same aluminum alloy as that of the second alloy portion 5b. The fastening member 5 is produced by performing a wiredrawing process, a boring process on the core 201, a header process, and other processes on the rod-like member 200. To enable such production, the aluminum alloy constituting the outer peripheral portion 202 serving as the second alloy portion 5b after the production preferably has breaking elongation of 8% or larger at room temperature.

Figure 8:
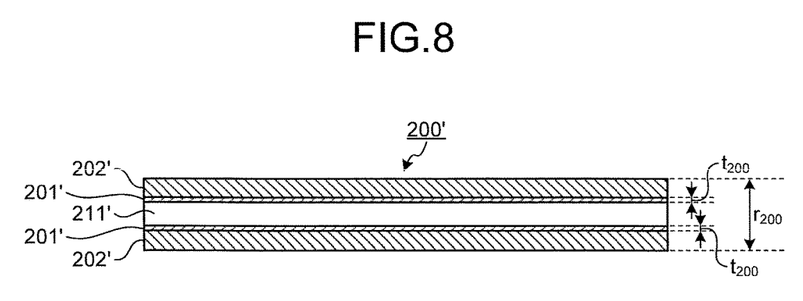
FIG. 8 is a sectional view of a structure obtained after performing a boring process on the rod-like member for a fastening member according to the second embodiment of the present invention.

FIG. 8 is a sectional view of a structure obtained after performing a boring process on the core 201 in the rod-like member 200. A rod-like member 200' illustrated in FIG. 8 includes a core 201' and an outer peripheral portion 202'. A thickness $t_{200}$ in the radial direction of the core 201' is $1/2000$ or larger and $1/10$ or smaller of a diameter $r_{200}$ of the rod-like member 200' ($r_{200}/2000 \leq t_{200} \leq r_{200}/10$). The rod-like member 200' including the core 201' according to the second embodiment is obtained by: performing a wiredrawing process on the rod-like member 200 and then performing a boring process to form a hole 211'. Subsequently, a header process and other processes are performed on the rod-like member 200', thereby producing the fastening member 5. The wiredrawing process may be performed after the boring process is performed on the rod-like member 200. Alternatively, after the wiredrawing process is performed on the rod-like member 200, the rod-like member 200 may be cut to have a length required for production of the fastening member 5 (nut) before the boring process is performed.

As described above, the second embodiment according to the present invention has a two-layered structure including the first alloy portion and the second alloy portion. The first alloy portion is provided to a part that comes into contact with a fastening target member and is made of an aluminum alloy having excellent stress corrosion cracking resistance. The second alloy portion is provided to the outer periphery of the first alloy portion and is made of an aluminum alloy having high strength. Similarly to the first embodiment, the second embodiment can provide a fastening member having high strength and excellent stress corrosion cracking resistance.

The screw threads are formed on part of the surface of the first alloy portion according to the second embodiment. The second embodiment thus can improve the stress corrosion cracking resistance at a part that comes into contact with the fastening target member.

The female screw according to the second embodiment has the first alloy portion on the inner periphery. The thickness in the radial direction of the first alloy portion is $1/2000$ or larger and $1/10$ or smaller of the major diameter of the female screw. The second embodiment thus can provide both the strength and the stress corrosion cracking resistance in an appropriate balance.

The second embodiment employs a rod-like member for a fastening member including the core and the outer peripheral portion. The core has a hollow cylindrical shape, is provided to a part that comes into contact with a fastening target member, and is made of an aluminum alloy having excellent stress corrosion cracking resistance. The outer peripheral portion has a cylindrical shape to cover the outer periphery of the core and is made of an aluminum alloy having high strength. The thickness in the radial direction of the core is $1/2000$ or larger and $1/10$ or smaller of the major diameter of the outer peripheral portion. The second embodiment thus enables production of a fastening member (nut) providing both the strength and the stress corrosion cracking resistance in an appropriate balance by the same manufacturing method as that of the conventional technology.

Third Embodiment

Figure 9:
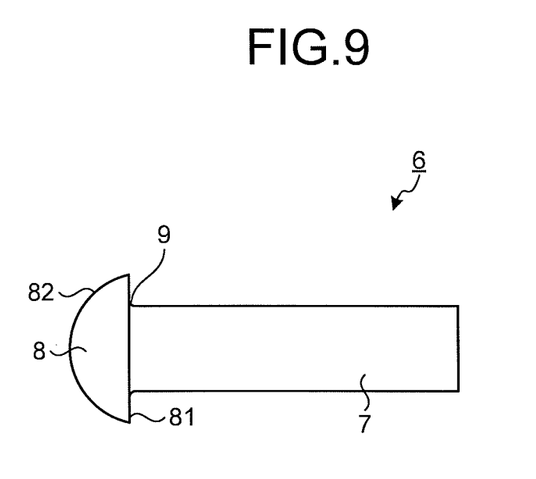
FIG. 9 is a side view of a structure of a fastening member according to a third embodiment of the present invention.
Figure 10:
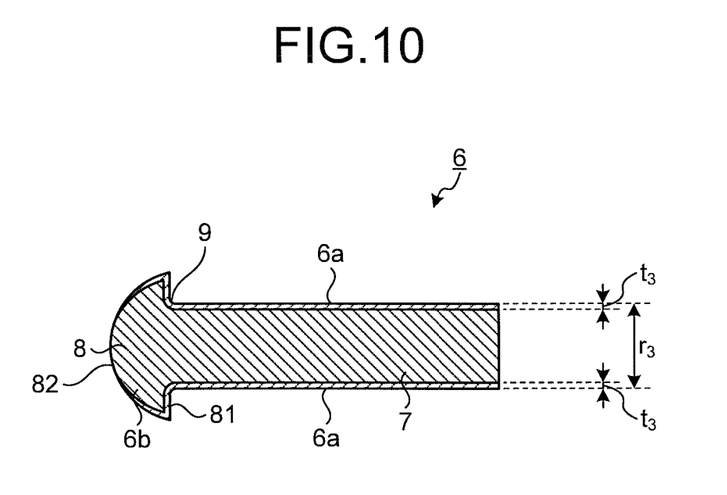
FIG. 10 is a sectional view along a center axis of the fastening member illustrated in FIG. 9.

FIG. 9 is a side view of a structure of a fastening member according to a third embodiment of the present invention. FIG. 10 is a sectional view along a center axis in the longitudinal direction (horizontal direction in FIG. 9) of the fastening member illustrated in FIG. 9. A fastening member 6 illustrated in these figures is a rivet made of a cladding material obtained by joining two different types of aluminum alloys. The fastening member 6 includes a shaft 7, a head 8, and a neck 9. The shaft 7 has a cylindrical shape. The head 8 is provided to an end in the height direction (horizontal direction in FIG. 9) of the cylinder serving as the shaft 7. The neck 9 corresponds to a boundary between the shaft 7 and the head 8. The shape (round head) of the head 8 illustrated in FIG. 9 is given by way of example only, and the head 8 may have another shape (e.g., a countersunk head).

The fastening member 6 has a first alloy portion 6a and a second alloy portion 6b made of two different types of aluminum alloys. The first alloy portion 6a is provided to a part that comes into contact with a fastening target member. In other words, the first alloy portion 6a serves as the surface layer of the shaft 7, the surface of the neck 9, the surface layer of a bearing surface 81 of the head 8, and at least part of the surface layer of an area connecting to the bearing surface 81 in a surface 82 of the head 8. The second alloy portion 6b serves as an inner part of the shaft 7 and a part other than the first alloy portion 6a in the head 8.

The first alloy portion 6a is made of the same aluminum alloy as that of the first alloy portion 1a according to the first embodiment. The second alloy portion 6b is made of the same aluminum alloy as that of the second alloy portion 1b according to the first embodiment. Similarly to the first alloy portion 1a, the thickness of the first alloy portion 6a is 10 μm or larger and 1.5 mm or smaller. The thickness in the radial direction of the first alloy portion 6a in the shaft 7 is $1/2000$ or larger and $1/10$ or smaller of an outer diameter $r_3$ (refer to FIG. 10) of the shaft 7. Similarly to the second alloy portion 1b, the second alloy portion 6b has Vickers hardness of 170 or higher and breaking elongation of 8% or larger at room temperature.

A thickness $t_3$ of the first alloy portion 6a in the shaft 7 is $1/2000$ or larger and $1/10$ or smaller of the outer diameter $r_3$ of the shaft 7 ($r_3/2000 \leq t_3 \leq r_3/10$). The fastening member 6 is produced by performing a wiredrawing process, a header process, and other processes on the rod-like member 100 illustrated in FIG. 4.

As described above, the third embodiment according to the present invention has a two-layered structure including the first alloy portion and the second alloy portion. The first alloy portion is provided to a part that comes into contact with a fastening target member and is made of an aluminum alloy having excellent stress corrosion cracking resistance. The second alloy portion is provided to the other part and is made of an aluminum alloy having high strength. Similarly to the first embodiment, the third embodiment can provide a fastening member having high strength and excellent stress corrosion cracking resistance.

The rivet according to the third embodiment has the first alloy portion on the outer periphery. The thickness in the radial direction of the first alloy portion in the shaft of the rivet is 1/2000 or larger and 1/10 or smaller of the outer diameter of the shaft. The third embodiment thus can provide both the strength and the stress corrosion cracking resistance in an appropriate balance.

The third embodiment employs a rod-like member for a fastening member made of a cladding material including the outer peripheral portion and the core. The outer peripheral portion has a hollow cylindrical shape, is provided to a part that comes into contact with a fastening target member, and is made of an aluminum alloy having excellent stress corrosion cracking resistance. The core has a cylindrical shape completely covered with the outer peripheral portion and is made of an aluminum alloy having high strength. The third embodiment thus enables production of a fastening member (rivet) having high strength and excellent stress corrosion cracking resistance by the same manufacturing method as that of the conventional technology.

The thickness in the radial direction of the outer peripheral portion of the rod-like member for a fastening member according to the third embodiment is 1/2000 or larger and 1/10 or smaller of the diameter of the rod-like member for a fastening member. The third embodiment thus can provide both the strength and the stress corrosion cracking resistance in an appropriate balance in the produced fastening member (rivet).

While the aspects to embody the present invention have been described, the first to the third embodiments are not intended to limit the present invention. The fastening member according to the present invention may be a machine screw or a self-tapping screw, which is a male screw other than bolts, for example.

Another layer made of an aluminum alloy having excellent stress corrosion cracking resistance may be provided on the surface of the first alloy portion according to the present invention. Examples of the aluminum alloy include, but are not limited to, a 2000 series-, a 3000 series-, a 4000 series-, and a 5000 series aluminum alloy.

As described above, the present invention may include various embodiments and the like not described herein. Various changes in the design and the like may be made without departing from the spirit of the invention defined by the claims.

REFERENCE SIGNS LIST 1, 5, 6 fastening member
1a, 5a, 6a first alloy portion
1b, 5b, 6b second alloy portion
2, 7 shaft
3, 8 head
4, 9 neck
21, 52 screw thread
21a crest
21b root
22 screw portion
31, 81 bearing surface
32 side surface
51, 211' hole
82 surface
100, 200, 200' rod-like member for a fastening member
101, 201, 201' core
102, 202, 202' outer peripheral portion

The invention claimed is:

1. A fastening member for fastening a plurality of members, the fastening member comprising:
 a first alloy portion made of an aluminum alloy including 0.005 wt % to 5.0 wt % zinc and 0.6 wt % to 2.0 wt % magnesium and provided to a part that comes into contact with at least one of the members; and
 a second alloy portion made of an aluminum alloy including more than 2.0 wt % and 5.0 wt % or less magnesium and more than 5.0 wt % and 10 wt % or less zinc and joined to the first alloy portion.

2. The fastening member according to claim 1, wherein Vickers hardness of the second alloy portion is 170 or higher.

3. The fastening member according to claim 1, wherein a screw thread is formed on part of a surface of the first alloy portion.

4. The fastening member according to claim 3, wherein the fastening member is a male screw including a cylindrical shaft with the screw thread formed on at least part of an outer periphery, a head provided to an end in an axial direction of the shaft, and a neck corresponding to a boundary between the shaft and the head,
 the first alloy portion serves as at least a surface layer of the screw thread, a surface of the neck, and a surface layer of a bearing surface of the head, and
 the thickness in a radial direction of the surface layer of the screw thread in the first alloy portion is 1/2000 or larger and 1/10 or smaller of a major diameter of the shaft.

5. The fastening member according to claim 3, wherein the fastening member is a female screw with the screw thread formed on an inner surface of a hole formed at a center,
 the second alloy portion is positioned on an outer periphery of the first alloy portion, and
 the thickness in a radial direction of the first alloy portion is 1/2000 or larger and 1/10 or smaller of a major diameter of the female screw.

6. The fastening member according to claim 1, wherein the fastening member is a rivet including a cylindrical shaft, a head provided to an end in an axial direction of the shaft, and a neck corresponding to a boundary between the shaft and the head,
 the first alloy portion serves as at least a surface layer of the shaft, a surface of the neck, and a surface layer of a bearing surface of the head, and
 the thickness in a radial direction of the first alloy portion in the shaft is 1/2000 or larger and 1/10 or smaller of an outer diameter of the shaft.

7. A rod-like member for a fastening member, comprising:
 a core made of an aluminum alloy having a cylindrical shape and including more than 2.0 wt % and 5.0 wt % or less magnesium and more than 5.0 wt % and 10 wt % or less zinc; and
 an outer peripheral portion made of an aluminum alloy having a hollow cylindrical shape completely covering a side surface of the core and including 0.005 wt % to 5.0 wt % zinc and 0.6 wt % to 2.0 wt % magnesium.

8. The rod-like member for a fastening member according to claim 7, wherein the thickness in a radial direction of the outer peripheral portion is 1/2000 or larger and 1/10 or smaller of a major diameter of the outer peripheral portion.

9. A rod-like member for a fastening member, comprising:
 a core made of an aluminum alloy having a hollow cylindrical shape and including 0.005 wt % to 5.0 wt % zinc and 0.6 wt % to 2.0 wt % magnesium; and an outer peripheral portion made of an aluminum alloy having a hollow cylindrical shape completely covering a side surface of the core and including more than 2.0 wt % and 5.0 wt % or less magnesium and more than 5.0 wt % and 10 wt % or less zinc.

10. The rod-like member for a fastening member according to claim 9, wherein the thickness in a radial direction of the core is 1/2000 or larger and 1/10 or smaller of a major diameter of the outer peripheral portion.

* * * * *